(12) United States Patent
Ekchian et al.

(10) Patent No.: US 8,106,760 B2
(45) Date of Patent: Jan. 31, 2012

(54) TURN SIGNALS GENERATED DURING OPERATION OF VEHICLE HAZARD WARNING LIGHTS

(75) Inventors: Gregory J. Ekchian, Belmont, MA (US); Berj A. Terzian, Newbury, MA (US); Jack A. Ekchian, Belmont, MA (US)

(73) Assignee: Trixcel, LLP, Newbury, MA (US)

( * ) Notice: Subject to any disclaimer, the term of this patent is extended or adjusted under 35 U.S.C. 154(b) by 516 days.

(21) Appl. No.: 12/181,879

(22) Filed: Jul. 29, 2008

(65) Prior Publication Data

US 2010/0026478 A1    Feb. 4, 2010

(51) Int. Cl.
*B60Q 1/52* (2006.01)
(52) U.S. Cl. ........ 340/471; 340/463; 340/464; 340/465; 340/468; 340/469; 340/475; 340/478
(58) Field of Classification Search ........... 340/463–475
See application file for complete search history.

(56) References Cited

U.S. PATENT DOCUMENTS

| | | | |
|---|---|---|---|
| 3,299,402 A * | 1/1967 | Schilling | 340/471 |
| 3,740,714 A * | 6/1973 | Ballou | 340/471 |
| 3,748,642 A * | 7/1973 | Radin et al. | 340/466 |
| 3,763,469 A * | 10/1973 | Yonezu et al. | 340/458 |
| 3,811,107 A * | 5/1974 | Sakurai | 340/458 |
| 3,986,022 A * | 10/1976 | Hyatt | 250/205 |
| 4,087,784 A * | 5/1978 | West | 340/471 |
| 4,173,013 A * | 10/1979 | Spiteri | 340/471 |
| 4,620,177 A * | 10/1986 | Hatanaka et al. | 340/475 |
| 4,682,146 A * | 7/1987 | Friedman, III | 340/468 |
| 4,859,988 A * | 8/1989 | Holtvluwer | 340/471 |
| 5,345,218 A * | 9/1994 | Woods et al. | 340/479 |
| 5,808,545 A * | 9/1998 | Brueggemann et al. | 340/468 |
| 5,872,511 A * | 2/1999 | Ohkuma | 340/471 |
| 6,025,656 A * | 2/2000 | Slater | 307/10.8 |
| 6,025,775 A * | 2/2000 | Erlandson | 340/436 |
| 6,069,559 A * | 5/2000 | Davis et al. | 340/468 |
| 6,181,243 B1 * | 1/2001 | Yang | 340/468 |
| 6,243,008 B1 * | 6/2001 | Korabiak | 340/463 |
| 6,515,584 B2 * | 2/2003 | DeYoung | 340/475 |
| 7,199,704 B2 * | 4/2007 | Herrig et al. | 340/471 |
| 7,352,278 B2 * | 4/2008 | Terzian | 340/471 |
| 7,808,376 B2 * | 10/2010 | Terzian | 340/471 |
| 7,852,203 B2 * | 12/2010 | Herrig et al. | 340/471 |
| 2002/0190847 A1 * | 12/2002 | Armstrong | 340/425.5 |
| 2005/0099286 A1 * | 5/2005 | DeYoung | 340/463 |
| 2005/0254240 A1 * | 11/2005 | Lawrence et al. | 362/231 |
| 2007/0285221 A1 * | 12/2007 | Howe et al. | 340/479 |
| 2009/0303029 A1 * | 12/2009 | Terzian | 340/471 |
| 2010/0026478 A1 * | 2/2010 | Ekchian et al. | 340/471 |

* cited by examiner

*Primary Examiner* — Daniel Wu
*Assistant Examiner* — Son M Tang
(74) *Attorney, Agent, or Firm* — Lucas & Mercanti, LLP

(57) ABSTRACT

Vehicle 4-way emergency flasher circuits are modified by circuit branches which enable flashing selected pairs of emergency lamps at a higher frequency or in other discernible different ways. These selected lamps become visible and recognizable as right or left turn signals while the 4-way flasher circuit is operating.

33 Claims, 3 Drawing Sheets

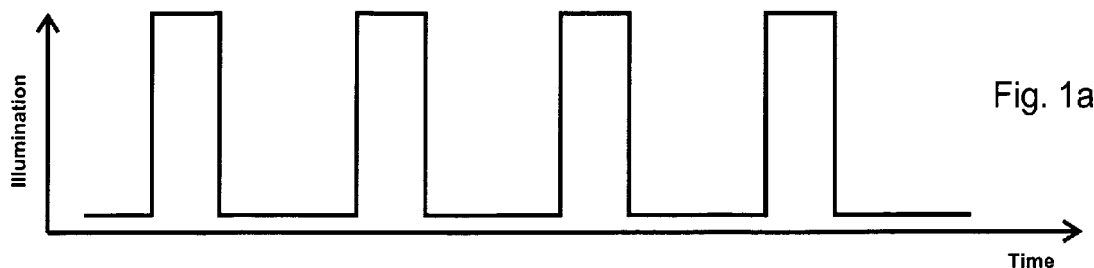
Fig. 1a
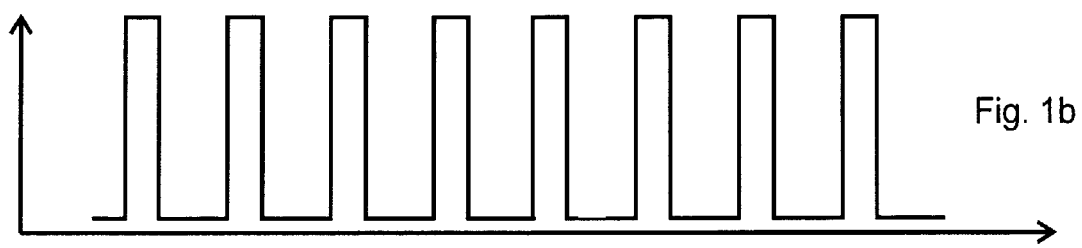
Fig. 1b
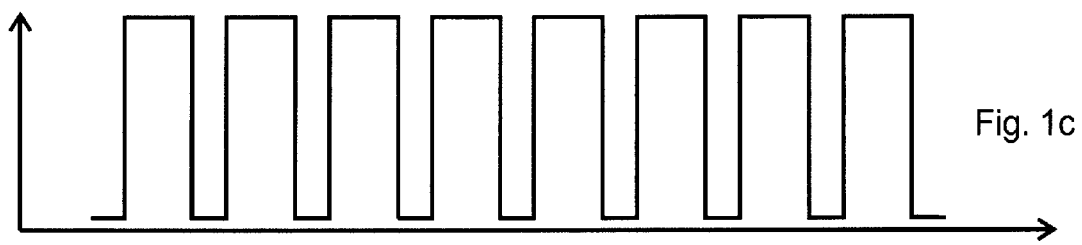
Fig. 1c
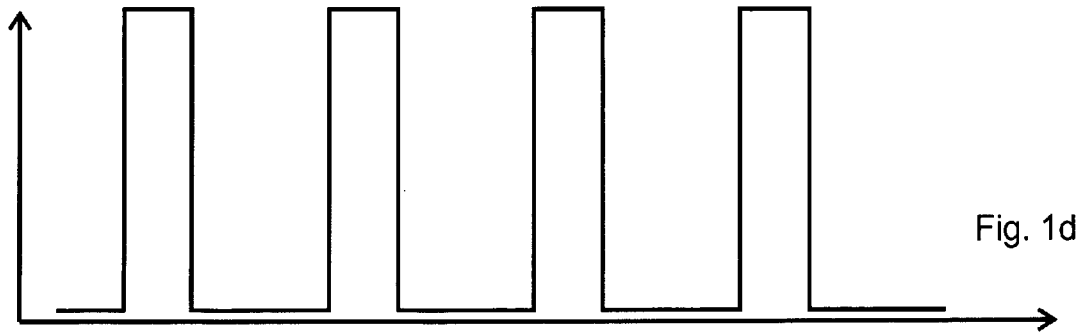
Fig. 1d
Fig. 1

TURN SIGNALS GENERATED DURING OPERATION OF VEHICLE HAZARD WARNING LIGHTS

BACKGROUND OF THE INVENTION

1. Field of the Invention

This invention relates to vehicle signals which are generated to become visible and recognizable as turn signals while the vehicle's 4-way hazard warning lights are operating.

2. Description of Prior Technology and Problem

US passenger vehicles and light trucks are required by the Department of Transportation (DOT) and the National Highway Traffic Safety Administration (NHTSA) to have flashing 4-way emergency hazard lights to warn approaching vehicles of the presence of an existing or imminent road hazard caused by a slowly moving or stopped vehicle. This hazard signal alerts approaching drivers to slow down and proceed with caution to avoid rear end crashes or other unsafe consequences during emergency or hazardous conditions.

Copending application Ser. No. 12/136,370, entitled CONTINUOUS ENHANCED VEHICLE HAZARD WARNING LIGHTS, filed by one of the present co-applicants, details the enormous losses in life, injuries, property damage and economic costs that are experienced every year in the USA from rear end crashes. That application is incorporated in its entirety by reference herein. Likewise, U.S. Pat. No. 7,352,278 issued Apr. 1, 2008 to assignee, Tritel, LLC, also cites the source of the accident statistics and is incorporated in its entirety by reference herein.

Both the incorporated application and the patent describe enhancement of the hazard warning lights by generating flashing lights in a triangular configuration in the rear of a slowly moving or stopped vehicle. Such modifications are more attention getting and alerting than conventional rear hazard lighting. Therefore, those innovations are ways of reducing or avoiding rear end crashes and thus improve highway safety.

Even with the advent of such improvements there is yet another difficulty with the conventional 4-way hazard lighting that is the focus of the present invention. In particular, when either the conventional or above cited improved hazard lights are operating, the vehicle no longer has the capability to give turn signals to approaching traffic. This is because usually the same flasher that activates the flashing 4-way hazard lights is also used to generate conventional left or right vehicle turn signal lights. Furthermore, the left and right vehicle turn signal lights typically are simultaneously flashed to generate the 4-way hazard lights. Therefore, when the emergency lamps are flashing, they mask attempts to display a turn signal.

In many hazardous conditions, a line of slowly moving or stationary vehicles often develops due to obstruction of a road or highway by an accident or stalled vehicle or other extraordinary situation ahead. Vehicles also occasionally must travel at unusually slow speeds, for example, due to mechanical problems, weather conditions or because they are towing a heavy trailer. Drivers confronted with such situations often need to warn oncoming traffic of the hazardous conditions by using their 4-way flashers. If, however, such drivers simultaneously need to turn, they have no effective way of signaling their intent to undertake such maneuvers. Therefore, there is a need for achieving an added measure of safety by providing a signal that will inform others not only of a hazardous situation, but also that the vehicle with its hazard lights flashing is about to turn left or right.

SUMMARY OF INVENTION

The present invention provides a simple, effective and inexpensive solution to the above discussed problem. In particular, the invention enables distinctively flashing the left or right turn signal lights at least in the rear, and preferably in the front of a vehicle as well, to simultaneously signal a turn is imminent or in progress while the 4-way flasher is operating. This is achieved by illuminating the left or right turn signal lights in a discernibly different manner than the other lights being activated by the 4-way flasher. In particular, the turn signal lights are flashed at a higher frequency or lower frequency than the remaining flashing 4-way emergency lamps, or with a different on/off duty cycle, or other techniques that would make the output of the turn signal lights noticeably different. These techniques include changing the illumination intensity of the turn signal lights. This provides drivers with the opportunity to indicate that a left or right turn is about to begin or has begun in the course of a hazardous road condition signified by the remaining flashing 4-way lamps.

Further features and details of the invention will be understood by reference to the following drawings.

BRIEF DESCRIPTION OF THE DRAWINGS

FIG. 1 shows a sampling of pulses that can be used to simultaneously activate the hazard lights and the innovative turn signal lights

DETAILED DESCRIPTION OF THE INVENTION

In FIG. 1a the illumination of the 4-way hazard lights is represented by a series of on and off pulses flashing at a predetermined frequency. The 4-way hazard lights typically include two emergency lamps at the front of the vehicle and two in the rear. It is also true that in some vehicles, especially larger passenger cars and trucks, additional emergency flashing lights are used. For example, the 4-way hazard lighting system in some large vehicles incorporate emergency lamps built into the external left and right rear view mirrors or in other positions such as in the mid section of the vehicle.

In FIG. 1b the illumination of the turn signal lamps is represented by a series of pulses that are at twice the frequency of the rest of the hazard lights, but in phase and at the same illumination intensity. The simultaneous operation of the hazard lights according to 1a and the turn signals lights according to 1b will allow the turn signal to be communicated to approaching drivers during a hazardous situation.

In FIG. 1c the illumination of the turn signal lights is represented by a series of pulses where the 4-way flasher pulses are applied to the turn signal lights, but with an additional pulse between each of the hazard pulses.

In FIG. 1d the turn signal lights are operated at a higher illumination intensity.

Figure 2:
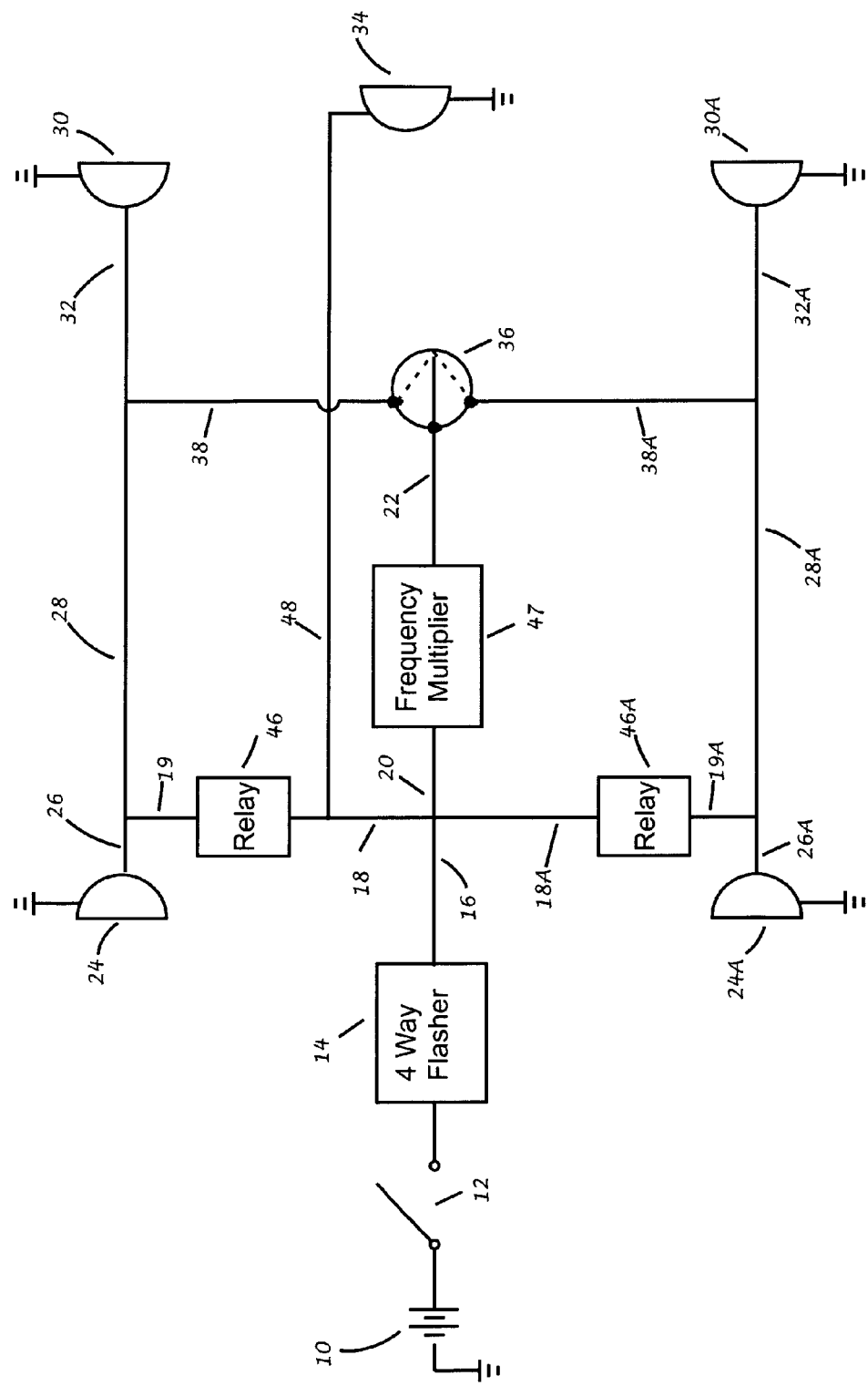
FIG. 2 is a block circuit diagram for performing one embodiment of the invention.

In the embodiment shown in FIG. 2, lead line 10 refers to the vehicle's electrical source. Lead line 12 refers to a switch which initiates operation of the vehicle's 4-way hazard lights, normally the four turn signal lamps, two in the front and two in the rear of the vehicle.

Upon pressing switch 12, the 4-way flasher circuit 14 begins emitting pulsed current into output lead 16. Branch lead 18 normally closed relay 46, and lead lines 19 and 26 transmit the pulses to the right front turn signal lamp 24 when a right turn is chosen by a driver. Similarly, branch lead 18A, relay 46A, and lead 19A and 26A transmit the pulses to the left front turn signal lamp 24A when a left turn is chosen.

Branch leads 28 and 32 transmit the pulses to the right rear turn signal lamp 30. Similarly, branch lead 28A and 32A transmit the pulses to the left rear turn signal lamp 30A. Parallel branched lead 48 and relay 37 transmit the pulses to the centrally located lamp 34.

Lamp 34 may be either the center high mounted stop lamp ("CHMSL") mandated by NHTSA"), as described in U.S. Pat. No. 7,352,278, or an additional (fifth) lamp, as described in copending application Ser. No. 12/136,370. At this point, all four of the turn signal lamps 24, 24A, 30, 30A and fifth lamp 34 are simultaneously and synchronously flashing to function as the vehicle's hazard warning lights. Lamps 30, 30A and 34 preferably form a flashing isosceles-shaped triangle in the rear of the vehicle, with lamp 34 at the apex and lamps 30 and 30A at the base vertices.

Switch 36 is a single pole, double throw switch that may be controlled by servo initiation in response to the driver's turn signal stalk, usually mounted on the vehicle's steering wheel post. Thus, if the driver desires to make a right turn, he or she shifts the stalk typically in the upward direction. A corresponding signal sent to switch 36 shifts its pivoting pole to the position indicated by the upper chain line within switch 36.

This connects lead 20, Frequency Multiplier 47, and lead 22 to lead 38. The pulses from the 4-way flasher circuit, as modified by the Frequency Multiplier 47, are shunted into lead 38 and ultimately to lamps 24 and 30. Simultaneously relay 47 is activated to open and thereby interrupt the pulses from the 4-way flasher from reaching lamps 24 and 30 directly.

Lamps 24 and 30 will therefore flash at a higher frequency than lamps 34, 24A and 30A. Thus, approaching drivers will see a composite signal with components of lower frequency pulses indicating a hazard situation and higher frequency pulses indicating a right turn. This condition will end when the turn signal stalk returns to its neutral position following completion of the right turn. At that time, another signal to switch 36 will shift it to its neutral position, thus disconnecting the Frequency Multiplier pulses from the lead 38 and terminating the action of the upper circuit branch. Relay 46 will also return to its normal closed position so that the pulses from the 4-way flasher can again reach lamps 24 and 30 to resume flashing of all five hazard lamps in the normal ongoing manner.

The lower circuit branch comprises the same components identified by the same reference numerals (plus suffixes "A") as in the upper circuit branch, and operates in the same way when a left turn is made while the 4-way flasher circuit is operating.

The frequency of the 4-way pulses preferably is approximately 105 pulses per minute. A higher frequency of 1.75 to 2.0 times greater is preferred for making the turn signal lights distinguishable from and recognizable as turn signals in comparison to the lower frequency pulses that illuminate the remaining flashing emergency lamp Although the embodiment disclosed in FIG. 2 uses a frequency multiplier, the invention can be achieved by illuminating the selected turn signal lights in other ways. For example signal lights can be illuminated by using different duty cycles, pulse addition, frequency reduction or altered light intensity for the turn signal lights. For example, the illumination of the turn signal lights may be increased by replacing frequency multiplier 47 with an amplifier circuit to boost the voltage of the pulse received by means of lead 16.

Figure 3:
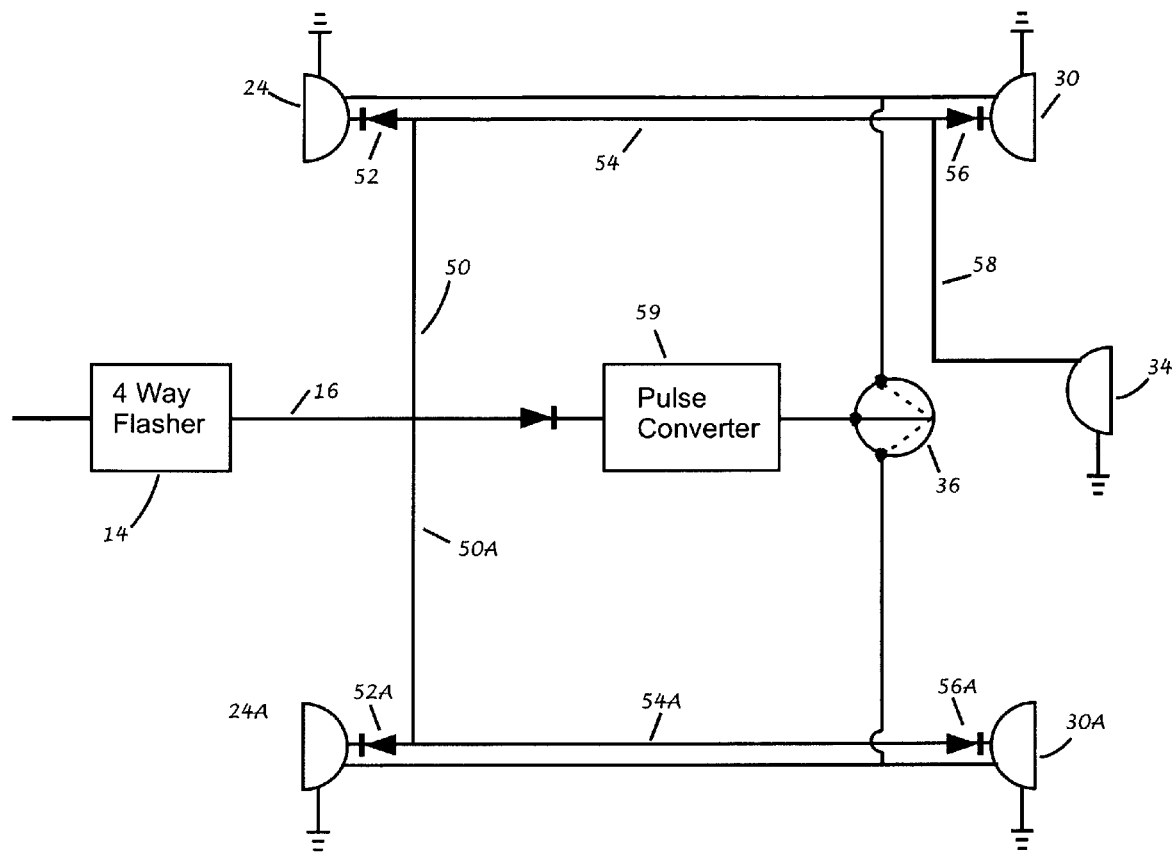
FIG. 3 is a block circuit diagram for performing another embodiment of the invention.

In the circuit diagram of FIG. 3, the pulses from the 4 way flasher are configured to reach the five emergency lamps 24, 30, 24A, 30A and 34 when the hazard warning lights are activated. However, when a turn signal is called for and switch 36 is activated, the resulting modified pulses are transmitted only to the chosen turn signal lamps by the blocking actions of silicon diodes 52, 56, 52A and 56A against reverse current flow into the remaining flashing emergency lamps. The pulse converter 59 modifies the pulses received from the 4-way flasher via lead 16 by, for example, amplifying the voltage to increase illumination as shown in FIG. 1d or by inserting additional pulses as shown in FIG. 1c.

The invention has been described in terms of its functional principles and illustrative embodiments. Many variations of such embodiments will be obvious to one skilled in the art. Therefore, it should be understood that the ensuing claims are intended to cover all changes and modifications of the illustrative embodiments which fall within the literal scope of the claims and all equivalents thereof.

The following is claimed:

1. In a motor vehicle having a 4-way emergency flasher with emergency lamps, a system for displaying turn signals during operation of the 4-way flasher circuit, which comprises:
    (a) means for activating the 4-way flasher to initiate flashing of the emergency lamps at a predetermined frequency, said lamps comprising two in the front and at least two in the rear of the vehicle,
    (b) means for transmitting current pulses from the 4-way flasher to a selected one of two pairs of flashing lamps, each pair being located respectively in the front and rear, and on the right or left half, of the vehicle, said transmission being initiated in response to the vehicle's turn signal control being placed in the position that selects a right or left turn, and
    (c) means for modifying the transmitted pulses in a manner that discernibly alters the appearance of the selected pair of lamps as being different from the remaining flashing emergency lamps, whereby approaching drivers can perceive the different appearance and understand that the vehicle is signaling a right or left turn while the 4-way emergency flasher is operating.

2. A system as in claim 1 wherein the modifying means comprises a frequency multiplier which increases the flashing frequency of the selected pair of lamps above the predetermined frequency of the other flashing emergency lamps.

3. A system as in claim 1 wherein the emergency lamps include a third lamp located above the two other lamps in the rear of the vehicle to form a flashing triangle that will more effectively capture the attention of and warn approaching drivers.

4. A system as in claim 3 wherein the third lamp is a CHMSL or an added lamp proximate to a CHMSL.

5. A system as in claim 1 wherein the transmitting means includes a single pole, double throw switch which, in response to the vehicle's turn signal control being placed in a right or left turn position and concomitant generation of a servo signal, shifts its pivotable pole into contact with leads that connect the modified current pulses to a selected pair of right or left turn lamps.

6. A system as in claim 5 in which each right or left turn circuit includes a normally closed relay that opens when the switch shifts its pivotable pole, thereby preventing reverse current flow into leads that connect to the other unmodified flashing emergency lamps.

7. A system as in claim 1 wherein the modifying means comprises a pulse generator that adds at least one additional pulse between every two consecutive pulses received from the 4-way flasher, thereby increasing the on time period relative to the off time period.

8. A system as in claim 1 wherein the modifying means comprises a voltage amplifier which increases the luminosity of the selected right or left turn lamps relative to the luminosity of the other flashing emergency lamps.

9. In a motor vehicle having a 4-way emergency flasher with emergency lamps, a method of displaying turn signals during operation of the 4-way flasher circuit, which comprises;
(a) activating the 4-way flasher to initiate flashing of the emergency lamps at a predetermined frequency, two such lamps being located in the front and at least two such lamps being located in the rear of the vehicle,
(b) transmitting current pulses from the 4-way flasher to a selected one of two pairs of flashing lamps, each pair being located respectively in the front and rear, and on the right or left half of the vehicle,
(c) initiating such transmission in response to the vehicle's turn signal control being placed in the position that selects a right or left turn, and
(d) modifying the transmitted pulses in a manner that discernibly alters the appearance of the selected pair of lamps as being different from the remaining flashing lamps, whereby approaching drivers can perceive the different appearance and understand that the vehicle is signaling a right or left turn while the 4-way flasher is operating.

10. A method as in claim 9 which includes modifying the selected pair of lamps by increasing their flashing frequency to greater than the predetermined frequency.

11. A method as in claim 9 which includes adding a third flashing lamp to the other two flashing lamps in the rear of the vehicle to form a flashing triangular pattern that will more effectively capture the attention of and warn approaching drivers.

12. A method as in claim 9 which includes modifying the transmitted pulses by adding a pulse into each cycle of the predetermined frequency to thereby increase the on time period relative to the off time period.

13. A method as in claim 9 which includes modifying the transmitted pulses by supplying higher voltage to the selected pair of flashing emergency lamps, thereby increasing their luminosity above the luminosity of the other flashing emergency lamps.

14. In a motor vehicle having a 4-way emergency flasher with emergency lamps, a method of displaying turn signals while the 4-way circuit is operating, which comprises:
(a) activating the 4-way flasher to initiate flashing of the emergency lamps at a predetermined frequency, two such lamps being located in the front and at least two such lamps being located in the rear of the vehicle,
(b) transmitting current pulses from the 4-way flasher to at least one selected flashing lamp located in the rear and the right or left half of the vehicle
(c) initiating such transmission in response to the vehicle's turn signal control being placed in a position which selects a right or left turn, and
(d) modifying the transmitted pulses in a manner that discernibly alters the appearance of the selected flashing lamp as being different from the remaining flashing lamps, whereby approaching drivers can perceive the different appearance and understand that the vehicle is signaling a right or left turn while the 4-way flasher is operating.

15. A vehicle comprising:
an emergency flasher system for generating signals for warning approaching vehicles comprising;
at least one left turn signal light and at least one right turn signal light;
an emergency flasher switch with an on and an off position, wherein the said left and right turn signal lights start flashing when said emergency flasher switch is in the on position; and
a turn signal control device with at least a left turn position and a right turn position;
wherein said at least one left turn signal light flashes at a different frequency, duty cycle or brightness from said at least one right turn signal light when said emergency flasher switch is placed in the on position and said turn signal control device is placed in a left turn position or a right turn position whereby the vehicle is signaling a right or left turn while the emergency flasher is operating.

16. A vehicle as in claim 15 wherein the at least one right turn signal light flashes at a higher frequency or brightness than the at least one left turn signal light when the said turn signal control device is in the right turn position.

17. A vehicle as in claim 16 wherein the at least one right turn signal light flashes at at least twice the frequency of the at least one left turn signal light when the said turn signal control device is in the right turn position.

18. A vehicle as in claim 15 wherein the at least one left turn signal light flashes at a higher frequency or brightness than the at least one right turn signal light when the said turn signal control device is in the left turn position.

19. A vehicle as in claim 18 wherein the at least one left turn signal light flashes at at least twice the frequency of the at least one right turn signal light when the said turn signal control device is in the left turn position.

20. A vehicle as in claim 15 wherein said turn signal control device is a turn signal stalk.

21. In a vehicle having at least one left turn signal light and at least one right turn signal light, an emergency flasher system for generating signals for warning approaching vehicles by flashing said turn signal lights and a turn signal control device with a left turn position and a right turn position, a method for the display of turn signals during operation of the emergency flasher system, the method comprising:
automatically flashing the said at least one left turn signal light at a different frequency, duty cycle or brightness from the at least one right turn signal light when the turn signal control device is moved to its left turn position or its right turn position whereby the vehicle is signaling a right or left turn while the emergency flasher is operating.

22. A claim according to claim 21, wherein the frequency of the at least one right turn signal light is higher than the frequency of the at least one left turn signal light when turn signal control device is moved to its right turn position.

23. A claim according to claim 21, wherein the frequency of the at least one left turn signal light is higher than the frequency of the at least one right turn signal light when turn signal control device is moved to its left turn position.

24. A vehicle comprising:
an emergency flasher system for generating signals for warning approaching vehicles comprising,
an emergency flasher switch with an on and an off position a turn signal switch with a left turn position and a right turn position a hazard warning light a turn signal light an emergency flasher that generates electrical pulses at a predetermined frequency, amplitude and duty cycle, when the emergency flasher switch is in the on position, that are transmitted to said hazard warning light such that said light flashes at said frequency and duty cycle at a predetermined brightness wherein said generated electrical pulses are converted to pulses of a different frequency amplitude or duty cycle and transmitted to said turn signal light when said turn signal switch is in the left turn or right turn position such that said turn signal light flashes at a different frequency, brightness or duty cycle than said hazard warning light.

25. In a vehicle having a turn signal light, a hazard warning light, an emergency flasher for generating pulses, an emergency switch with an on and off position, and a turn signal switch with a left turn and a right turn position, a method for the display of turn signals during the operation of the hazard warning light, the method comprising:

generating electrical pulses with the emergency flasher transmitting said pulses to said hazard warning light such that it flashes at a predetermine frequency, brightness or duty cycle, altering said pulses and transmitting said altered pulses to said signal light such that said turn signal light flashes simultaneously at different frequency, brightness or duty cycle.

26. An electrical circuit in a vehicle for signaling other vehicles, the circuit comprising:

a hazard warning switch with an on position and an off position, a turn signal switch with a right turn position, a left turn position and a neutral position, and wherein the circuit is configured to operate at least one of:

a left turn signal light, a right turn signal light, and an additional hazard warning light, by flashing it or them at a predetermined frequency, duty cycle and brightness when said hazard warning switch is in the on position and said turn signal switch is in the neutral position, wherein the circuit is further configured to operate at least one left turn signal light differently from at least one right turn signal light when said hazard warning switch is in the on position and said turn signal switch is in the left turn position or the right turn position.

27. A circuit according to claim 26 wherein the circuit is further configured to operate at least one left turn signal light and at least one right turn signal light by flashing them at said predetermined frequency, duty cycle and brightness when the hazard warning switch is in the on position and the turn signal switch is in the neutral position.

28. A circuit according to claim 26 wherein said at least one left turn signal light is operated differently from said at least one right turn signal light by flashing one at a different frequency, duty cycle or brightness from the other.

29. A circuit according to claim 26 wherein said additional hazard warning light is a centrally located light in the rear of the vehicle.

30. A method for using an electric circuit of a vehicle to display signals visible to other vehicles, the circuit comprising an electrical hazard warning switch with an on position and an off position, a turn signal switch with a right turn position, a left turn position and a neutral position, and at least one hazard warning light, the method comprising:

flashing at least one hazard warning light by placing said hazard warning switch in said circuit in the on position, operating at least one left turn signal light differently from at least one right turn signal light while said hazard warning switch is in the on position by placing the turn signal switch in said circuit in the left turn position or the right turn position.

31. A method according to claim 30, wherein flashing said at least one hazard warning light includes flashing at least one left turn signal light, at least one right turn signal light and at least one additional light.

32. A method according to claim 30, wherein said additional light is a centrally located light in the rear of the vehicle.

33. A method according to claim 30, wherein the at least one right turn signal light operates differently from the at least one left turn signal light by being flashed at a different frequency, duty cycle, or brightness when the turn signal switch is in the right turn position or left the turn position.

* * * * *